United States Patent
De Block et al.

(10) Patent No.: US 6,836,927 B2
(45) Date of Patent: Jan. 4, 2005

(54) WIPER BLADE WITH WIPER STRIP TO CARRIER ELEMENT ATTACHMENT MEANS

(75) Inventors: Peter De Block, Halen (BE); Peter Wijnants, Wezemaal (BE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 10/030,770

(22) PCT Filed: Feb. 10, 2001

(86) PCT No.: PCT/DE01/00513

§ 371 (c)(1),
(2), (4) Date: May 2, 2002

(87) PCT Pub. No.: WO01/62559

PCT Pub. Date: Aug. 30, 2001

(65) Prior Publication Data

US 2002/0148063 A1 Oct. 17, 2002

(30) Foreign Application Priority Data

Feb. 23, 2000 (DE) .......................................... 100 08 271
May 25, 2000 (DE) .......................................... 100 25 710

(51) Int. Cl.[7] .................................................. B60S 1/38
(52) U.S. Cl. .............................. 15/250.43; 15/250.452; 15/250.451
(58) Field of Search .......................... 15/250.43, 250.44, 15/250.451, 250.452, 250.453, 250.48, 250.454, 250, 361

(56) References Cited

U.S. PATENT DOCUMENTS 2,687,544 A * 8/1954 Scinta ................... 15/250.452
2,983,945 A * 5/1961 De Pew ................. 15/250.452

(List continued on next page.)

FOREIGN PATENT DOCUMENTS

| DE | 1028896 | * | 4/1958 | |
|----|---------|---|--------|---|
| DE | 1 505 357 | | 5/1969 | |
| DE | 41 39 048 A | | 6/1993 | |
| DE | 195 43 239 A | | 5/1997 | |
| DE | 195 44 126 A | | 5/1997 | |
| DE | 296 11 722 U1 | | 12/1997 | |
| DE | 19627115 | * | 1/1998 | |
| EP | 0 278 798 A | | 8/1988 | |
| FR | 1348401 | * | 12/1963 | ............... 15/250.43 |
| FR | 1446657 | * | 6/1966 | ............ 15/250.452 |
| GB | 2036547 | * | 7/1980 | |

*Primary Examiner*—Gary K. Graham
(74) *Attorney, Agent, or Firm*—Michael J. Striker

(57) ABSTRACT

A wiper blade (10) for windows, in particular of motor vehicles, is proposed that is equipped with a long, rubber-elastic wiper strip (14) that can be placed against the window (22), that is situated parallel to the longitudinal axis on a long, spring-elastic carrier element (12) to which a component (16) belonging to a device for attaching the wiper blade (10) to a driven wiper arm (18) is directly connected, whereby the carrier element (12) has springs (28, 30) designed in the shape of a strap lying in front of the window (22) in a plane that is basically parallel to the window, the bottom surfaces of the strap (13) of which face the window, the inner, adjacent longitudinal edges (32) of which have a distance between them and plunge individually into longitudinal grooves (54, 56) assigned to each longitudinal edge and open toward the longitudinal side of the wiper strip, and that are connected to each other by way of at least two transverse ribs (36) situated in the longitudinal direction with distance between them. A reliable and stressfree attachment of the wiper strip to the carrier element is insured when each transverse rib (36) has a center section (42) that extends at a distance from the top strap surfaces (11) of the springs (28, 30) so that bridge-like transverse ribs result, whereby the distance (34) between the two springs is less than the bridge width (46), and means of attachment (74, 76, 78) are situated on the carrier element (12) to secure the wiper strip (14) to the carrier element (12) in its longitudinal direction.

7 Claims, 4 Drawing Sheets

U.S. PATENT DOCUMENTS

| | | | |
|---|---|---|---|
| 3,116,507 A | * | 1/1964 | Scinta .................... 15/250.451 |
| 3,696,497 A | * | 10/1972 | Quinlan et al. ............... 29/592 |
| 3,703,018 A | * | 11/1972 | Seiler et al. ............ 15/250.452 |
| 3,707,741 A | * | 1/1973 | Roberts ................. 15/250.452 |
| 4,063,328 A | * | 12/1977 | Arman .................... 15/250.43 |
| 4,399,987 A | | 8/1983 | Cucelli |
| 5,060,917 A | | 10/1991 | Dubos |
| 5,860,638 A | | 1/1999 | Nix |
| 6,279,191 B1 | * | 8/2001 | Kotlarski et al. ...... 15/250.201 |
| 2002/0133894 A1 | * | 9/2002 | Dietrich et al. .......... 15/250.43 |
| 2002/0148064 A1 | * | 10/2002 | Dietrich et al. .......... 15/250.43 |

* cited by examiner

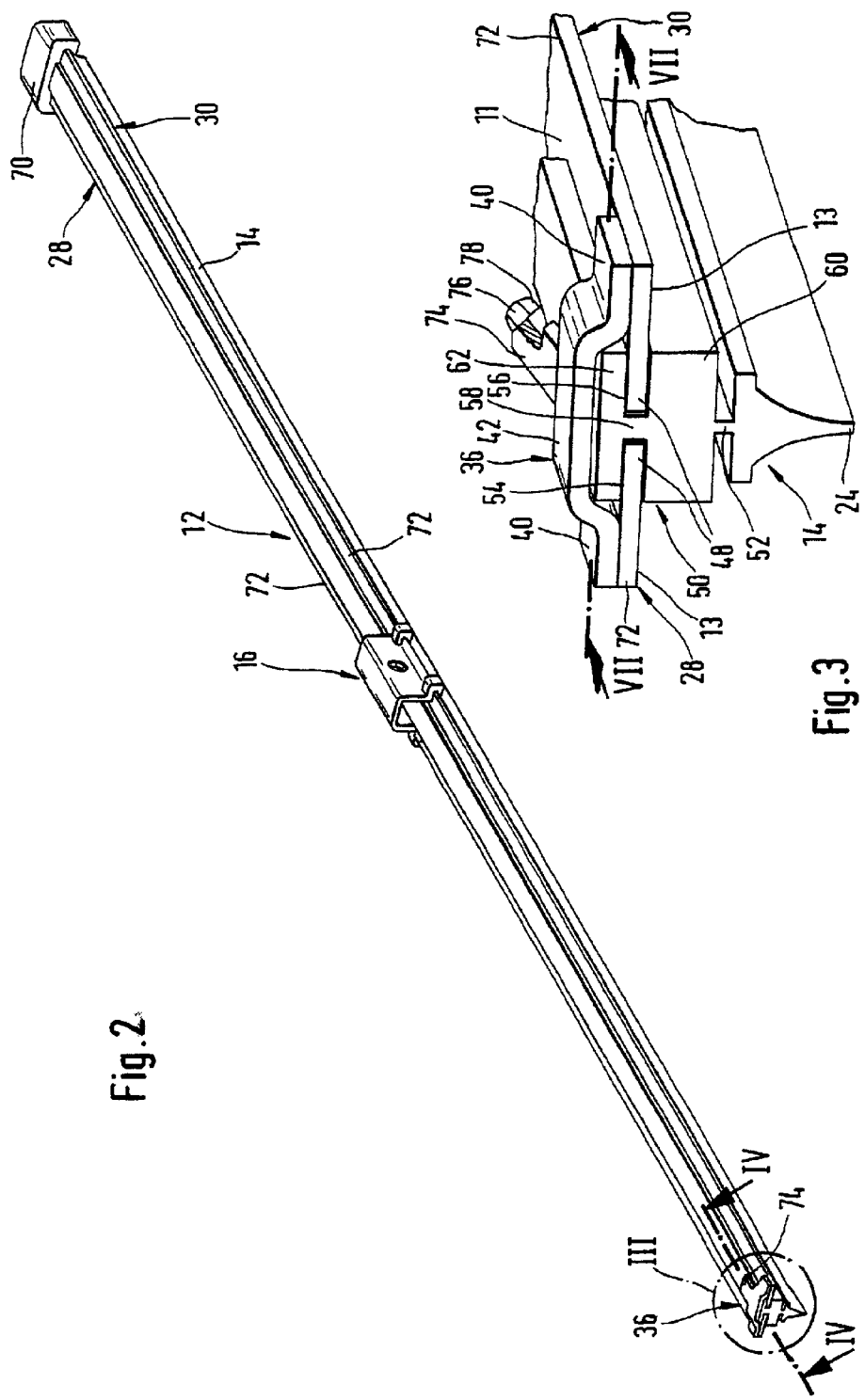

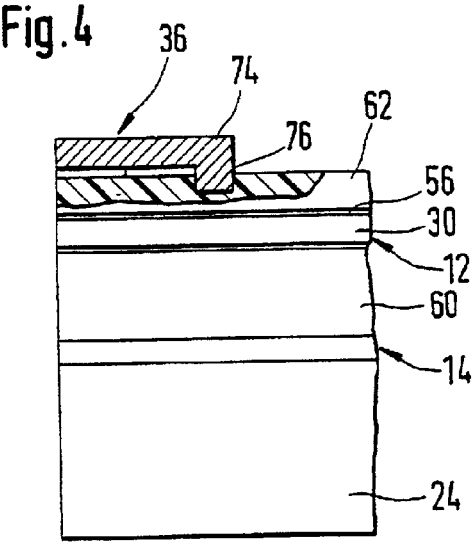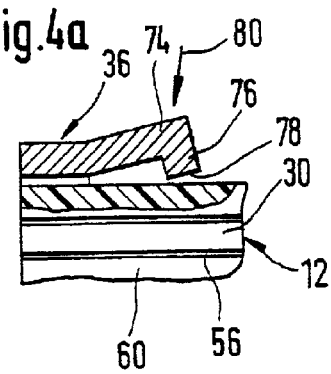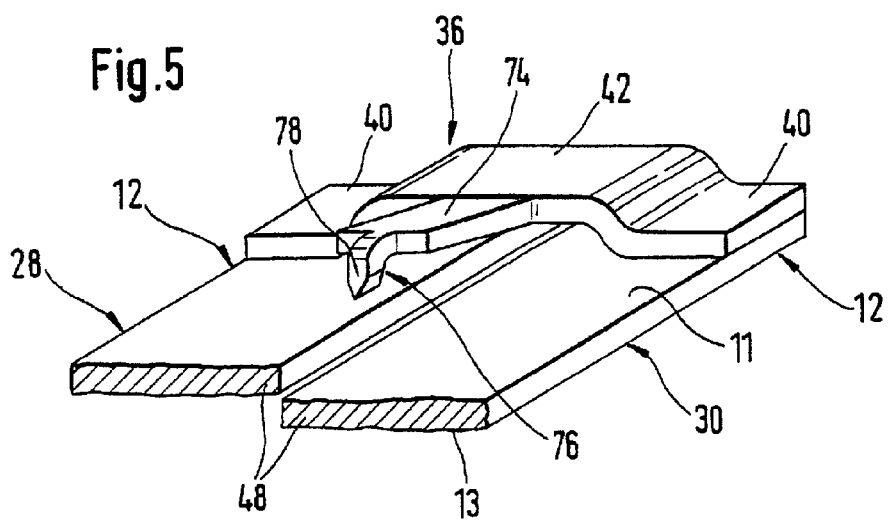

WIPER BLADE WITH WIPER STRIP TO CARRIER ELEMENT ATTACHMENT MEANS

BACKGROUND OF INVENTION

In wiper blades of the type described according to the present invention, the carrier element is intended to insure the most even distribution possible of the wiper blade contact pressure against the window exerted by a wiper arm connected to the wiper blade over the entire wiping field covered by the wiper blade. Due to a corresponding curvature of the non-loaded carrier element—i.e., when the wiper blade does not lie against the window—the ends of the wiper strip lying fully against the window during the wiping operation of the wiper blade are loaded toward the window by way of the carrier element, which is then taut, even if the curvature radii of spherically curved motor vehicle windows change with each position of the wiper blade. The curvature the wiping blade must therefore be somewhat greater than the greatest curvature measured in the wiping field of the window to be wiped. The carrier element therefore replaces the expensive carrying strap construction having two loose springs situated in the wiper strip, as implemented In traditional wiper blades (DE-OS15005357).

The invention is based on a wiper blade. With the known wiper blade of this type (DE-GM publication 29611722.6), the two springs are connected to each other as a single art by way of transverse ribs situated on both of its ends. Since these transverse ribs are located in the plane of the springs, one of the end sections of the slit lying between the longitudinal edges facing each other and enclosed by the springs and the transverse ribs must be expanded in such a fashion that the wiper strip can be property installed in the slit. However, this act of expansion can disadvantageously change the spring properties of the carrier element in terms of the intended wiping results. Additionally, it is cost-intensive to manually insert the wiper strip in the slit by way of this expansion. Moreover, the wipe strip of the known wiper blade must be shorter than the springs, the two ribs o which situated on their ends lie outside the wiper strip. As a result, the height of the wiping field determined by the length of the wiper strip cannot always be designed to the maximum, because the transverse ribs extending beyond the ends of the wiper strip must be taken into account.

SUMMARY OF THE INVENTION

In addition to the considerable advantages in the design of the carrier element in terms of its spring properties and the particularly simple, cost-effective installation of the wiper strip in the carrier element—the wiper strip can be slid between the springs of the carrier element from one of the two open longitudinal ends, whereby the bridge-like transverse ribs do not stand in the way of this installation procedure—the length of the carrier element can now also be adapted to the length of the wiper strip. In specifying the height of the wiping field and determining the distance between the window wiper on the driver's side and the window wiper on the passenger's side, as well as the distance between the two wiper shafts used with pendulum wiper systems, no carrier element transverse ribs projecting above the wiper strip need to be taken into account.

Problem-free installation of the wiper blade is guaranteed when the means of attachment can be brought into their securing position after the wiper strip is positioned in the carrier element.

A simple, cost-effective shaping of the springs is possible when the means of attachment are situated on one of the transverse ribs.

An unrestricted adaptation of the wiper strip to the constantly changing window curvature is possible during wiping operation if the means of attachment are situated on a transverse rib that is located in the region of one of the end sections of the two springs.

So that the means of attachment do not impair the sliding path for the wiper strip, the means of attachment comprise an extension designed in the shape of a tongue that extends from the center section of one transverse rib to the other end section of the two springs.

Furthermore, when the extension designed in the shape of a tongue grips a non-sensitive region of the wiper strip, e.g., a cover strip of the wiper strip located above the two longitudinal grooves as well as above the top strap surfaces of the springs, the wiping quality is not impaired by the act of fixation.

This can be realized in particularly simple fashion when the extension designed in the shape of a tongue has at least one projection pointing toward the cover strip of the wiper strip as the fixing means.

A reliable anchoring of the wiper strip in the carrier element is achieved when the free end of the projection is designed in the shape of a bezel.

In certain applications, it can be advantageous when multiple projections pointing toward the back strip are situated on the extension designed in the shape of a tongue as the fixing means.

A stable and permanent anchoring of the wiper strip in the carrier element is achieved when the transverse ribs as well as the extension designed in the shape of a tongue connected as a single part to one of the transverse ribs are made out of metal.

Additional advantageous further developments and designs of the invention are indicated in the following description of embodiments presented in the accompanying diagram.

BRIEF DESCRIPTION OF DRAWINGS

FIG. 2 shows a straight representation of the wiper blade according to FIG. 1 not drawn to scale and drawn perspectively, whereby a protective cap situated on the ends of the wiper blade is removed, FIG. 3 shows an enlarged view of an item labelled with "III" in FIG. 2, FIG. 4 shows a sectional longitudinal view through the wiper blade according to FIG. 2 along the line IV—IV in an enlarged representation, FIG. 4a shows the arrangement according to FIG. 4 in an intermediate installation position, FIG. 5 shows the end section from FIG. 3 of the carrier element belonging to the wiper blade rotated by 180°.

DESCRIPTION OF THE PREFERRED EMBODIMENTS

Figure 1:
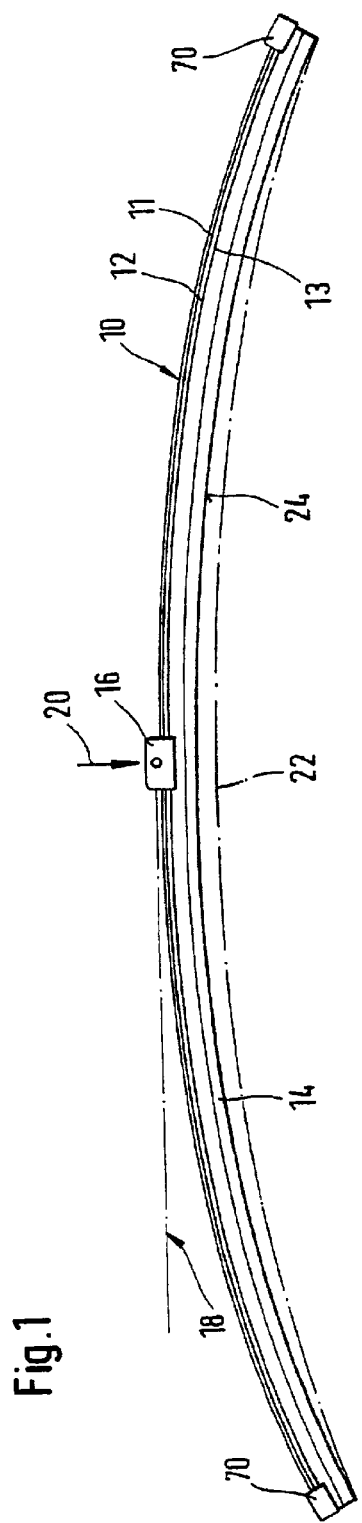
FIG. 1 shows a side view of a wiper blade according to the invention.

A wiper blade 10 shown in FIGS. 1 and 2 comprises a long, spring-elastic carrier element 12 designed in the shape of a strap, on the underside 13 of which a long, rubber elastic wiper strip 14 is situated parallel to the longitudinal axis.

The part 16 of a connecting device on the side of the wiper blade is situated directly on the top 11 of the carrier element 12—also referred to as a spring bar—in its center section. Using the connecting device, the wiper blade 10 can be connected in detachable and hinged fashion to a driven wiper arm 18 indicated in FIG. 1 by a dash-dotted line. To achieve this, the part of the connecting device on the wiper arm side is provided on the free end of the wiper arm 18. The wiper arm 18 is loaded in the direction of the arrow 20 toward the window to be wiped, e.g., toward the windshield of a motor vehicle window, the surface of which to be wiped is indicated in FIG. 1 using a dash-dotted line. Since the line 22 is intended to represent the greatest curvature of the window surface, it is clear that the curvature of the wiper blade 10—not yet loaded, and lying against the window with both of its free ends—is greater than the maximum window curvature (FIG. 1). Under the contact pressure (arrow 20), the wiper blade 10 lies against the window surface 22 with its wiper lip 24 along its entire length. Tension thereby builds up in the spring-elastic carrier element 12 made out of metal, for example, that insures the proper placement of the wiper strip 14 and the wiper lip 24 with its entire length against the window, and insures an even distribution of the contact pressure.

A first embodiment of the wiper blade 10 shall be described below in greater detail using FIGS. 3 and 7. It is obvious in FIG. 7 that the carrier element 12 of the wiper blade 10 lies at a distance 26 in front of the window 22 to be wiped. Its arrangement is therefore selected so that its strap surfaces 11 and 13 are located in a plane that extends basically parallel to the window surface 22 to be wiped. The carrier element 12 has two springs 28 and 30 designed in the shape of a strap lying in a common plane parallel to each other. The inner longitudinal edges 32 facing each other are thereby located at a distance 34 from each other. They are connected to each other by way of a bridge-like transverse rib 36 on each of the two ends of the springs 28, 30; they are welded together, for example. Each bridge-like transverse rib thereby lies with both of its end sections 40 on the top 11 of the carrier element 12 and its springs 28, 30 (FIG. 5). Each of the two transverse ribs 36 has a center section 42 that is located at a distance 44 from the top strap surface 11 of the springs and that therefore gives it its bridge-like shape. Since the longitudinal extension 46 of the center sections 42—also referred to as the bridge width—is greater than the distance 34 between the inner longitudinal edges 32 facing each other, the two springs 28 and 30 extend with inner side strips 48 into the region of the center sections 42, whereby the side strips 48 are situated at a distance 44 below the center sections 42. In addition to the tasks of the carrier element 12 mentioned previously with regard for distribution of contact pressure, this is also intended to insure a stressfree guidance of the wiper strip 14 in accordance with specifications, and, therefore, low-noise wiping operation. This is also achieved by way of the dimensional coordination between the carrier element 12 and the wiper strip 14 described below.

Figure 7:
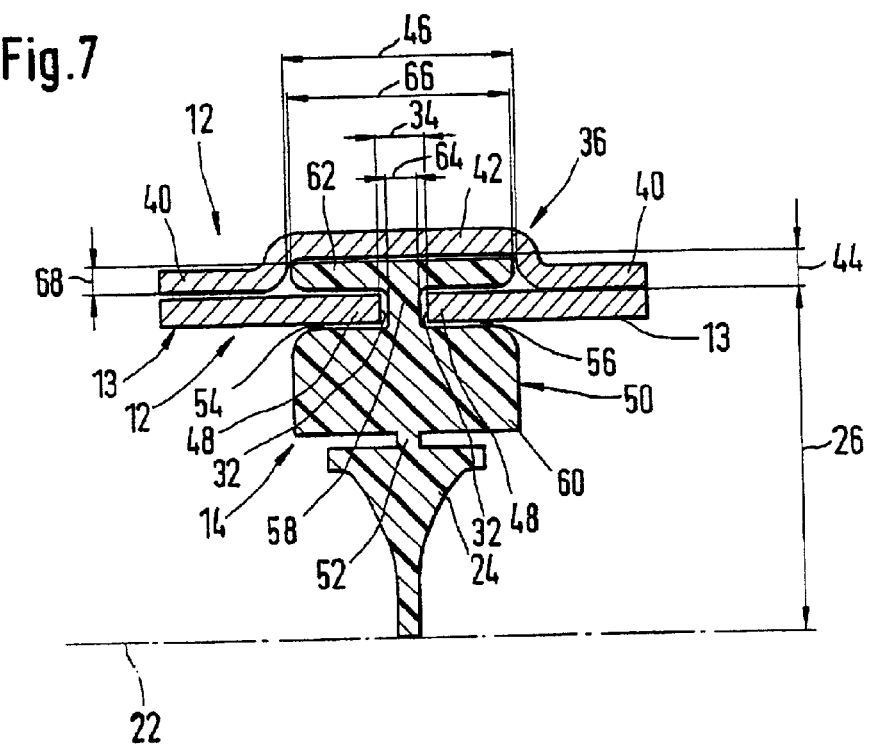
FIG. 7 shows the sectional area of a section through the item according to FIG. 3 along the line VII—VII.

The wiper strip 14 of this first embodiment has a cross section illustrated in FIGS. 3 and 7. It has a top brace 50 with which the wiper lip 24 performing the actual wiping work is connected by way of a narrow strip segment 52. The arrangement of the strip segment 52 makes it possible for the wiper lip 24 to tilt during the wiping motion into a dragging position that performs the act of wiping and that is known by the expert. The top brace 50 is provided with longitudinal grooves on its opposite longitudinal sides that are open-sided toward these longitudinal sides. The longitudinal grooves 54 and 56 serve to accommodate the inner side strips 48 of the springs 28 and 30. The depth of the longitudinal grooves 54 and 56 is selected to insure that a wall 58 remains between the two longitudinal grooves. The top brace 50 therefore has a base strip 60 and a cover strip 62 which are connected to each other by the wall 58. The thickness 64 of the wall 58 is less than the distance 34 between the inner longitudinal edges 32 of the springs 28, 30, and it is smaller than the distance between the inner side strips 48. The width of the two longitudinal grooves 54 and 56 in the top brace 50 is coordinated with the thickness of the springs 28, 30 and their inner side strips 48 in such a manner that a stressfree attachment of the wiper strip 14 to the carrier element 12 is guaranteed when the wiper strip is assembled with the carrier element 12 (FIGS. 3 and 7). Since the width 66 of the cover strip 62 is also somewhat smaller than the bridge width 46 of the center section 42, and its thickness 68 is less than the distance 44 between the center section 42 and the top sides 11 of the springs 28, 30, the wiper strip 14—which is manufactured cost-effectively using an extrusion process and has a uniform cross section over its entire length—can be slid into the carrier element 12 in the longitudinal direction without difficulty and thereby be connected with it in stressfree fashion.

The part 16 of the connecting device for the wiper arm situated in the center section of the wiper blade 10 encloses each of the outer side strips 72 of the springs 28, 30 and the carrier element 12 extending out of the longitudinal grooves 54 and 56 (FIG. 2). The joint between the part 16 and the carrier element 12 can be positive and/or non-positive. A welded joint as for the transverse ribs 36 is also feasible. The part 16 of the connecting device, like the transverse ribs 36 on the ends, therefore forms a center transverse rib which, like the transverse ribs 36, also helps to stabilize the wiper blade and also makes it possible to connect the wiper arm 18 and the wiper blade 10. With a corresponding length of the wiper blade 10, it can also be advantageous if further corresponding transverse ribs are situated between the two transverse ribs 36 situated on the ends. To prevent injuries that occur in handling the wiper blade, in particular by end users, a protective cap 70 is situated on both springs 28, 30 and on the transverse ribs 36 on the ends which is preferably made out of plastic and which preferably snaps into place (FIGS. 1 and 2).

As mentioned previously, the wiper strip 14 should be guided onto the carrier element 12 in stressfree fashion so the wiper lip 24 can adapt to the changing course of curvature of the window surface 22 during the wiping operation. To prevent the situation in which the wiper lip 14 can thereby wander out of the springs 28, 30 of the carrier element 12 in the longitudinal direction, the carrier element 12 is provided with means of attachment on one of the transverse ribs 36 that are preferably brought into active connection with the wiper strip after the wiper strip 14 is slid into the carrier element 12.

In a first embodiment of the invention (FIGS. 3 through 5), these means of attachment comprise an extension 74 designed in the shape of a tongue that is connected as a single part with the center section 42 of the transverse rib 36 made out of a metal. The extension 74 extends from the center section 42 to the other end section of the two springs 28, 30. On its free end, the extension 74 comprises a projection 76 acting as a fixing means for the wiper strip 14 and pointing toward the cover strip 62, which is designed in the shape of a bevel on its free end 78. Before the wiper blade is installed, the extension 74 is bent out of the plane of its center section 42 so far that the extension of the bridge-like passage between the springs 28, 30 and the center section 42 is open (compare FIGS. 4a and FIG. 5), so that the wiper strip 14 can therefore be easily installed via sliding into the carrier element 12. When this has reached its specified position in relation to the carrier element 12, the extension 74 is bent in the direction of the arrow 80 so that the projection 76 penetrates—cuts into or elastically deforms—the cover strip 62 of the wiper strip 14 with its bezel 78 and fixes the wiper blade into position (FIG. 4). The means of attachment 74, 76, 78 can therefore be brought into their securing position after the wiper strip is positioned on the carrier element. Such a fixing into position takes place advantageously at only one point so that an optimal adaptation of the wiper strip to the changing window curvature is insured. The illustration in FIG. 5 shows the end of the carrier element 14 shown in FIG. 3, i.e., without the wiper strip 14, but viewed in the opposite direction. The transverse rib present on the other end of the carrier element—covered by the protective cap 70 in FIG. 2—comprises no means of attachment to secure the wiper strip on the carrier element, for the reason mentioned previously. The transverse rib 36 shown in FIG. 2 with its extension 74 is also covered by a cap 70, of course, when the wiper blade is fully assembled (refer to FIG. 1).

Figure 6:
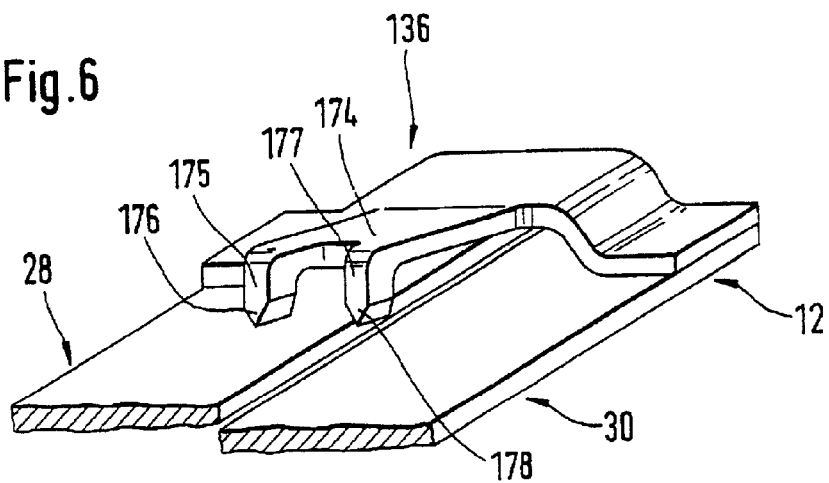
FIG. 6 shows the arrangement according to FIG. 5 in another embodiment of the invention.

For special applications of the invention and according to another embodiment shown in FIG. 6, the transverse rib 136—the basic design of which is identical to the transverse rib 36 described above—and its extension 174 designed in the shape of a tongue can be provided with multiple projections—with two projections 175, 176 in this case—the free ends 177, 178 of which are also designed in the shape of a bezel. The function of these means of attachment fully corresponds to the function of the means of attachment according to FIGS. 3 through 5.

In both example cases, means of attachment 74, 76, 78, and 174, 175, 176, 177, 178 are situated on the carrier element 12 and on a transverse rib 36 belonging to this that serve to secure the wiper bar 14 against the carrier element 12 in its longitudinal direction. Since, as explained previously, the part 16 of the connecting device is also a transverse rib of the carrier element, it is feasible to situate corresponding means of attachment on the part 16.

Instead of relatively stiff extensions 74 and 174, the means of attachment can also be formed by elastically displaceable tongues that can be temporarily displaced out of their securing position against elastic force. The projection and the bezel could definitely be replaced with means of attachment designed in the shape of claws or barbs.

What is claimed is:

1. A wiper blade for windows, in particular of motor vehicles, comprising:
   a long, rubber-elastic wiper strip (14) that can be placed against the window (22), wherein said wiper strip is situated parallel to a longitudinal axis on a long, spring-elastic carrier element (12) to which a component (16) belonging to a device for attaching the wiper blade (10) to a driven wiper arm (18) is directly connected, wherein the carrier element (12) has springs (28, 30) designed in the shape of a strap having top and bottom surfaces and lying in front of the window (22) in a plane that is substantially parallel to the window, wherein the bottom surfaces of the straps (13) of which face the window, wherein inner, adjacent longitudinal edges (32) of the springs situated at a distance from each other plunge individually into longitudinal grooves (54, 56) assigned to each longitudinal edge and open toward the longitudinal side of the wiper strip, and are connected to each other by way of a least two transverse ribs (37) situated in the longitudinal direction with distance between them, wherein at least one transverse rib (36) has a center section (42) that extends at a distance from the top strap surfaces (11) of the springs (28, 30) so that at least one bridge-like transverse rib results, whereby the distance (34) between the two springs in particular is less then a bridge width (46), wherein means of attachment (74, 76, 78 and 174, 175, 176, 177, 178) for securing the wiper strip to the carrier element in the longitudinal direction are disposed as one-piece on one of the transverse ribs, wherein the means of attaching are situated on a transverse rib (36) located in the region of one end section of the two springs (28, 30), and wherein the means of attachment comprise an extension (74 and 174) designed in the shape of a tongue that extends from the center section (42) of one transverse rib (36) toward the other end section of the two springs.

2. The wiper blade according to claim 1, wherein the means of attachment (74, 76, 78 and 174, 175, 176, 177, 178) can be brought into their securing position after the wiper strip (14) is positioned on the carrier element (12).

3. The wiper blade according to claim 1, wherein the extension (74 and 174) designed in the shape of a tongue grips a cover strip (62) of the wiper strip (14) with fixing means (78 and 177, 178) located above the two longitudinal grooves (54, 56) as well as above the top strap surfaces (11) of the springs (28, 30).

4. The wiper blade according to claim 1, wherein the extension designed in the shape of a tongue has at least one projection pointing toward a cover strip (62) of the wiper strip (14) as a fixing means.

5. The wiper blade according to claim 4, wherein the projection (76) is designed in the shape of a bezel on its free end.

6. The wiper blade according to claim 4, wherein multiple projections (175, 176) pointing toward the cover strip (62) are situated on the extension (174) designed in the shape of a tongue as fixing means.

7. The wiper blade according to claim 1, wherein the transverse ribs (36) as well as the extension (74 and 174) designed in the shape of a tongue and connected with one of the transverse ribs as a single part are made out of metal.

* * * * *